United States Patent [19]

Katz

[11] Patent Number: 4,472,443
[45] Date of Patent: Sep. 18, 1984

[54] APROTIC SOLVENT DECAFFEINATION

[75] Inventor: Saul N. Katz, Monsey, N.Y.

[73] Assignees: General Foods Corporation, White Plains, N.Y.

[21] Appl. No.: 191,200

[22] Filed: Sep. 26, 1980

[51] Int. Cl.$^3$ ................................................. A23F 5/20
[52] U.S. Cl. ..................................... 426/428; 544/275
[58] Field of Search ......................... 544/275; 426/428

[56] References Cited
U.S. PATENT DOCUMENTS
953,073 3/1910 Trillich ................................. 426/428

OTHER PUBLICATIONS

Jacob et al., Dimethyl Sulfoxide, 1971, Marcel Dekker: New York, vol. I, p. 113.
Martin et al., Dimethyl Sulfoxide, 1975, Van Nostrand Reinhold Co., Ltd.: Berkshire, England, pp. Preface (V), 49–51, 269, 436.

*Primary Examiner*—Joseph M. Golian
*Attorney, Agent, or Firm*—Thomas A. Marcoux; Thomas R. Savoie; Daniel J. Donova

[57] ABSTRACT

The process disclosed herein is capable of decaffeinating green coffee beans at a moisture content near that employed for shipping and storage. The green coffee beans are contacted with dimethyl sulfoxide, an aprotic solvent, to remove at least a portion of the caffeine. The caffeine is preferably removed from the solvent by use of a solid adsorbent such as activated carbon.

8 Claims, No Drawings

APROTIC SOLVENT DECAFFEINATION

DESCRIPTION

The present invention relates to decaffeination, and more particularly to an improved process for decaffeinating green coffee beans with a caffeine-specific solvent.

The prior art has long sought a process to effectively and non-destructively remove caffeine from green coffee beans. Up until the present time, however, it has not been possible to obtain practical rates of extraction without the addition of substantial amounts of water to the green beans. The addition of water prior to or during extraction requires additional equipment and can also increase process time and energy requirements. Moreover, the water added to achieve decaffeination must be removed during subsequent processing. This not only requires additonal time and energy, but can also impair the flavor of the final product. Therefore, it would be desirable to provide an alternative procedure which could be employed on green coffee beans of any moisture content and avoid the need for pre-wetting.

BACKGROUND ART

Commercial decaffeination techniques often involve solvent extraction from pre-wetted whole green beans such as described by Patel et al. in U.S. Pat. No. 3,671,263 who use a chlorinated hydrocarbon solvent, and by Berry et al. in U.S. Pat. No. 2,309,092 who use a caffeine-deficient aqueous solution of coffee solubles. Recently, a decaffeination method was disclosed in U.S. Pat. No. 3,879,569 to Vitzthum et al. wherein quantitative extraction of caffeine from raw coffee beans is achieved with moist, liquid carbon dioxide at a pressure above the critical pressure. Also, in U.S. Pat. No. 3,806,619 to Zosel, caffeine is extracted from green coffee by moist supercritical carbon dioxide, and in U.S. Pat. No. 3,843,824 to Roselius et al. caffeine is extracted from roasted coffee by contact with moist supercritical carbon dioxide. These procedures, like the earlier solvent processes, however, require that the beans be wetted to obtain efficient rates of extraction.

It has been the experience of the prior art that even the strongest caffeine solvents previously employed could not effectively decaffeinate dry, green coffee beans.

DISCLOSURE OF INVENTION

The present invention now enables decaffeination of green coffee beans, whether wet or dry, by an improved process of the type comprising contacting the beans with a caffeine solvent, maintaining the contact for a period of time sufficient to extract at least a portion of the caffeine present in the green coffee beans, and separating the caffeine solvent from the green beans, wherein the improvement comprises employing dimethyl sulfoxide as the caffeine solvent.

The present invention takes advantage of the discovery that dimethyl sulfoxide, an aprotic solvent, can free caffeine from green coffee beans in their low moisture state typically employed for shipping and storage. That this solvent can free caffeine selectively from green coffee beans without the overt additon of moisture is surprising in view of the art-recognized need to moisten the beans prior to extraction.

The green coffee beans employed according to the present invention can be of any of the principal commercial varieties. It is an advantage of the present invention, however, that the milder and more highly aromatic coffees such as Colombian coffees can be decaffeinated effectively. The green coffee beans can have any desired moisture content, but will typically contain less than about 20% moisture based on the total weight of the beans. The degree and selectivity of extraction at these low moisture contents is superior to any known prior art procedure. Preferably, the beans will have a moisture content on the order of that normally employed for shipping and storage. Typically, this moisture content will be less than about 10% and is most often within the range of from 4% to 9%. At these moisture contents, the beans are stable against deterioration due to microorganisms and staling.

The solvent, dimethyl sulfoxide, is an aprotic solvent which neither donates nor accepts protons in its solvating capacity. It is believed that a complex exists in the green coffee beans between potassium chlorogenate and caffeine which prior art experience has been shown to be quite resistant to even the strongest caffeine solvents unless water was present to break up the complex. Surprisingly, while not wishing to be bound to any particular theory of operation, it appears that the dimethyl sulfoxide is capable of breaking up this complex without the presence of moisture. Dimethyl sulfoxide is a colorless hygroscopic liquid having a boiling point of about 189° C. It is known to be an extremely powerful aprotic solvent which readily penetrates animal skin and other tissues. While the moisture content of the beans can be as low as desired, the dimethyl sulfoxide is advantageous because it is miscible with water and can be employed with beans of virtually any moisture content.

The solvent should be contacted with beans in sufficient quantities and under other conditions effective to provide an acceptable rate and degree of extraction. Preferably, the concentration of the caffeine within the dimethyl sulfoxide during contact should be maintained at a level below about 0.3, preferably below about 0.05, grams per kilogram of dimethyl sulfoxide to obtain an effective rate of decaffeination. An advantage of dimethyl sulfoxide is that it is quite selective for caffeine versus chlorogenic acid. Other coffee components, however, such as sugars, are dissolved to varyng degrees by the dimethyl sulfoxide. It is preferred to maintain the concentration of these other soluble materials at relatively high levels, preferably near their points of saturation, within dimethyl sulfoxide.

The degree of saturation of the dimethyl sulfoxide with the caffeine can be maintained at an effectively low level in a batch operation by using a sufficiently large quantity of the solvent so that at the desired degree of decaffeination, the dimethyl sulfoxide will be capable of dissolving all of the extracted caffeine. Alternatively, and preferably, a solid adsorbent is added to the solvent to act as a caffeine sink, drawing the caffeine from the solution and thereby maintaining an effective driving force for the extraction of caffeine from the green coffee beans.

Where the solid adsorbent is employed it is preferably highly selective with regard to caffeine as opposed to the other components within the extract solution which comprises the solvent, caffeine, and other dissolved coffee solids. This can be achieved by selecting a solid adsorbent material which is initially highly selective toward caffeine or by making it so by loading it to its point of saturation with the other coffee solubles. Where desired, the selectivity of the solid adsorbent can be improved by coating it with a suitable caffeine-selective coating, such as described in my commonly assigned, copending patent application Ser. No. 159,725, filed on June 16, 1980, and entitled "Adsorption Decaffeination."

Any of the usual solid adsorbents known to the art for uses such as this can be employed. The adsorbent must be able to adsorb caffeine and be physically stable under the conditions of processing. Among the known caffeine adsorbents are clays such as discussed in U.S. Pat. Nos. 2,391,981 and 2,416,484 to Kremers; zeolites or ion exchange resins as taught in U.S. Pat. No. 3,108,876 to Turken et al.; hydrated silicates as taught in U.S. Pat. No. 2,375,550 to Grossman; polymeric non-ionogenic adsorption resins, especially styrene divinylbenzene macroreticular resins of the type disclosed by Gustafson in U.S. Pat. No. 3,531,463; and activated carbon, especially finely-divided activated carbon derived from coconut or coal. Preferably, the adsorbent will comprise a member selected from the group consisting of activated carbon, clay, hydrated silicates, zeolites, ion exchange resins, non-ionogenic adsorption resins, and any combination of these. Among these, activated carbon is preferred because of its desirable balance between cost and effectiveness.

The solid adsorbent should be employed in sufficient quantities to maintain an effectively low concentration of caffeine within the dimethyl sulfoxide solvent during the period of contact between the green beans and solvent. The exact amount of solid adsorbent employed will depend upon the capacities of both the dimethyl sulfoxide and the solid adsorbent at the particular temperatures involved. Also, it may be desired to provide a major excess of the solid adsorbent to obtain the highest possible driving force for the decaffeination.

The process can be conducted either batch-wise or continuously. Batch operation has the advantage of simplicity in that all that must be done to achieve the desired results is to admix the materials. Continuous operation is, however, preferred because it decreases the overall size of the equipment required and the processing time. Moreover, by constantly withdrawing and renewing either the dimethyl sulfoxide or the solid adsorbent by removal of caffeine, the total quantity of solvent and solid adsorbent can be minimized. The greatest driving force for the extraction can be achieved where the flow of beans is countercurrent to the flow of solvent. This can be done either in a totally continuous or a stage-wise procedure in equipment of the type known to the art. Another advantage of continuous or semi continuous operation is that the solvent can be contacted with the beans in a continuously flowing stream and then passed to a separate bed of solid adsorbent where the solvent is renewed by removal of the caffeine. Operation in a configuration such as this will eliminate any need for contact between the green coffee beans and the solid adsorbent.

Also important for obtaining good extraction according to the invention is the temperature maintained during contact between the beans and the caffeine solvent. The temperature will affect the rate of extraction, the selectivities of the solvent and the solid adsorbent, and the relative capacities of the solvent and solid adsorbent for holding extracted caffeine. The temperature will also affect the flavor of the final coffee product. Accordingly, it is not possible to identify a single temperature or range of temperatures as universally defining optimum conditions. It is believed, however, that temperatures within the range of from about 50° C. to about 100° C. will provide good results. The selection of a specific temperature will depend on the materials, processing equipment and conditions employed, and may be within or outside of this range.

Total contact time, or residence time within an extractor will depend upon the factors discussed above as well as the desired degree of caffeine extraction. While economics is a controlling factor, it must be borne in mind that excessively long contact times adversely affect coffee flavors. Those skilled in the art will be able to balance these factors as necessary, given the exemplary situation set forth in the Example.

The green beans decaffeinated according to the procedure of the present invention are then roasted in conventional fashion to obtain a high quality decaffeinated coffee and can be blended in the normal fashion. It is an advantage of the present invention that, because it is not necessary to pre-wet the beans prior to decaffeination, it is not necessary to dry the beans prior to roasting or to extend the roast time to accommodate the excess moisture content. This improves the efficiency of the operation and decreases the amount of energy required for roasting the beans. The elimination of the need to drive off the excess moisture also tends to improve the quality of the final product.

BEST MODE FOR CARRYING OUT THE INVENTION

The following Example is provided to illustrate and explain what is presently considered the best mode for carrying out the invention. The data is for illustrative purposes to guide the person of ordinary skill in the art and is not to be taken as limiting in any regard. Unless otherwise indicated, all parts and percentages are by weight.

EXAMPLE

In a beaker, 10 grams of green Colombian coffee beans containing about 6% water are contacted with 100 grams of dimethyl sulfoxide. Also added to the beaker are 10 grams of 12×40 mesh activated carbon to adsorb caffeine from the diemthyl sulfoxide. The contents of the beaker are maintained at a temperature of about 82° C. for about 8 hours. Upon analysis, 82.6% of the original caffeine content of the beans has been removed.

The above description is for the purpose of describing the invention to people having ordinary skill in the art to enable them to practice it. It is not meant to detail all of the obvious modifications and variations of the invention which will become apparent upon reading. It is intended, however, that these modifications and variations be included within the scope of the invention which is defined by the following claims.

I claim:

1. An improved method for decaffeinating green coffee beans by a process comprising contacting the beans with a caffeine solvent, maintaining the contact for a period of time sufficient to extract at least a portion of the caffeine present in the beans, and separating the caffeine solvent from the beans, wherein the improvement comprises contacting the beans at a moisture content of less than about 20% with sulfoxide as the caffeine solvent.

2. A method according to claim 1 wherein the beans have a moisture content of from 4 to 9% prior to contact with the caffeine solvent.

3. A method according to claim 1 which includes the further step of contacting the caffeine solvent with a solid adsorbent to remove at least a portion of the caffeine dissolved therein.

4. A method according to claim 3 wherein the solid adsorbent comprises a member selected from the group consisting of activated carbon, clay, hydrated silicates, zeolites, ion exchange resins, non-ionogenic adsorption resins, and any combination of these.

5. A method according to claim 1 wherein the caffeine solvent is maintained saturated with respect to soluble coffee components other than caffeine.

6. A method according to claim 5 which includes the further step of contacting the caffeine solvent with a solid adsorbent to remove at least a portion of the caffeine dissolved therein.

7. A method according to claim 6 wherein the solid adsorbent comprises a member selected from the group consisting of activated carbon, clay, hydrated silicates, zeolites, ion exchange resins, non-ionogenic adsorption resins, and any combination of these.

8. A method according to claim 6 wherein the beans have a moisture content of less than about 20% prior to contact with the caffeine solvent.

* * * * *